United States Patent
Kwon

(10) Patent No.: US 10,603,986 B2
(45) Date of Patent: Mar. 31, 2020

(54) STRUCTURE OF WING-KNOB FOR AIR VENT

(71) Applicant: Hyundai Motor Company, Seoul (KR)

(72) Inventor: Hyuk-Jae Kwon, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 175 days.

(21) Appl. No.: 14/924,581

(22) Filed: Oct. 27, 2015

(65) Prior Publication Data

US 2016/0229259 A1 Aug. 11, 2016

(30) Foreign Application Priority Data

Feb. 11, 2015 (KR) .................. 10-2015-0020755

(51) Int. Cl.
*B60H 1/34* (2006.01)

(52) U.S. Cl.
CPC ... *B60H 1/3414* (2013.01); *B60H 2001/3471* (2013.01)

(58) Field of Classification Search
CPC .................................................. B60H 1/3414
USPC ............................................................ 454/152
See application file for complete search history.

(56) References Cited

U.S. PATENT DOCUMENTS

| 2009/0286462 | A1* | 11/2009 | Goto | B60H 1/3428 454/155 |
| 2012/0129444 | A1* | 5/2012 | Kober | B60H 1/3414 454/284 |
| 2013/0267158 | A1* | 10/2013 | Noichl | B60H 1/3414 454/155 |
| 2015/0328959 | A1* | 11/2015 | Suzuki | B60H 1/3421 454/155 |
| 2017/0057326 | A1* | 3/2017 | Cho | B60H 1/3421 |

FOREIGN PATENT DOCUMENTS

| CN | 102815184 A | 12/2012 |
| CN | 103038079 A | 4/2013 |
| JP | 5-66454 U | 9/1993 |
| JP | 2003-276428 A | 9/2003 |
| JP | 2013-241026 A | 12/2013 |
| KR | 10-0833164 B1 | 5/2008 |
| KR | 101041343 B1 * | 6/2011 |
| KR | 10-2013-0073486 A | 7/2013 |
| KR | 10-2013-0090659 A | 8/2013 |

* cited by examiner

*Primary Examiner* — Steven B McAllister
*Assistant Examiner* — Allen R Schult
(74) *Attorney, Agent, or Firm* — Morgan, Lewis & Bockius LLP

(57) ABSTRACT

A structure of a wing knob for an air vent in which an insertion hole is formed, and two latching pins are protruded, and either one among a vertical blade and a horizontal blade arranged in a front side and a rear side is inserted into the insertion hole, and another among the vertical blade and the horizontal blade is inserted between the latching pins may include a knob body at which is formed the insertion hole through one side of which either one blade among the vertical blade and the horizontal blade penetrates and is inserted, and at a rear side is formed an opening hole, and a rear cover at a front side of which is combined a left-right stopper and at a rear side of which is formed latching pins.

3 Claims, 4 Drawing Sheets

STRUCTURE OF WING-KNOB FOR AIR VENT

CROSS-REFERENCE TO RELATED APPLICATION

The present application claims priority to Korean Patent Application No. 10-2015-0020755 filed Feb. 11, 2015 the entire contents of which is incorporated herein for all purposes by this reference.

BACKGROUND OF THE INVENTION

Field of the Invention

The present invention relates to a structure of wing knob for air vent provided in the car cabin. More particularly, the present invention relates to a structure of wing knob for air vent which can suppress the occurrence of damage caused by stress concentration.

Description of Related Art

An air conditioning system is mounted on the car to maintain the temperature, humidity and the like in the car cabin to be comfortable.

The air conditioning system comprises an air conditioner which supplies cold air by using the phase change of coolant, and a heater supplying hot air by using the heat of the cooling water heated at the engine, and the cold air and hot air produced respectively at the air conditioner and the heater are discharged into the car cabin through the air vent provided on the dashboard.

As disclosed in the prior art, the vertical blade and horizontal blade are arranged at the front side and the rear side of the air vent to be able to adjust the wind direction of the cold air or the hot air.

Each of the horizontal blade and vertical blade are arranged in such a way that a number of blades compose a row, in which when any one blade is rotated to face a particular direction, all the remaining blades are rotated by being interlocked. In addition, a wing knob is combined to any one arranged at the side near the car cabin to improve the convenience of operation.

The wing knob is slidably mounted at one of the blades arranged at the side near the car cabin so that the driver can adjust the wind direction, and two latching pins are formed at the side far from the car cabin so that one of the blades arranged at the side far from the car cabin is inserted between the latching pins.

Therefore, according to the left-right movement and the upward-downward movement of the wing knob, the direction of the cold air or hot air discharged from the air vent is adjusted.

Meanwhile, FIG. 1A is an exploded view of a conventional wing knob. The conventional wing knob comprises a knob body 1 formed with an insertion hole 2 so that both side surfaces and rear side surface are all opened, and a rear cover 5 combined to the rear side of the knob body 1 and formed with a pair of latching pins 7 between which the blade arranged far from the car cabin is inserted.

That is, when the blade 8 arranged near the car cabin enters the insertion hole 2 of the knob body 1, the rear cover 5 closes the rear side of the insertion hole 2, where the blade arranged far from the car cabin is inserted into the latching pins 7 at the rear side of the rear cover 5.

Meanwhile, in the conventional structure, the combination of the knob body 1 and the rear cover 5 is carried out in such a way that the hooks in the form of wedge formed at the rear side of the knob body 1 are inserted into each of the holes 6 formed at the rear cover 5, and the blade 8 is combined while the silicon rubber 4 coated with oil is mounted on the knob body 1 to perform the lubrication function and to prevent the clattering at the time of sliding between the knob body 1 and the blade 8.

However, since the knob body 1 is operated (in the upward-downward direction and the left-right direction) under the condition that the blade 8 is inserted into the insertion hole 2, there is a problem in that the stress is accumulated near the place of combination of the hook 3 and the hole 6 so that the deformation occurs as shown in FIG. 1B.

In addition, there can occur the problem in that a chemical crack occurs due to the repeated friction and the chemical reaction between the oil and the knob body 1 so that the front side of the knob body 1 is broken.

That is, in the conventional structure, the stress is concentrated near the place of combination of the hook 3 and the hole 6 upon the operation of the wing knob, and the repeated stress concentration has caused the breakage at the hook 3 or the portion near the hook.

Furthermore, the knob body 1 and the rear cover 5 manufactured with the synthetic resin by being injection molded have difficulty in maintaining the shape and size of the insertion hole 2, hook 3 and hole 6 to be uniform due to the manufacturing process (due to the post deformation occurring at the time of cooling after injection molding).

In addition, an indicator (not shown) (indicating the possible direction of sliding) and the like may be additionally inserted into the insertion hole 2 in the knob body 1 before the combination of the blade 8, however, there could occur a problem in that the inlet portion of the insertion hole 2 is stretched wide at the time of assembly of the indicator and the silicon rubber 4 so as to cause the deformation and the damage.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure of wing knob for air vent which can suppress the occurrence of breakage by preventing the phenomenon of stress concentration at the conventional hook and in which the insertion hole is opened only in lateral direction so as to minimize the post deformation after the injection molding.

According to various aspects of the present invention, a structure of a wing knob for an air vent in which an insertion hole is formed, and two latching pins are protruded, and either one among a vertical blade and a horizontal blade arranged in a front side and a rear side is inserted into the insertion hole, and another among the vertical blade and the horizontal blade is inserted between the latching pins may include a knob body at which is formed the insertion hole through one side of which either one blade among the vertical blade and the horizontal blade penetrates and is inserted, and at a rear side is formed an opening hole, and a rear cover at a front side of which is combined a left-right stopper and at a rear side of which is formed latching pins, wherein the rear cover is combined with the opening hole so that the left-right stopper is closely pushed to the blade which is inserted into the insertion hole.

A rubber damper may be mounted in the insertion hole to be placed at the front side of the blade which is inserted into the insertion hole.

A screw hole may be formed respectively at both sides of the knob body behind the insertion hole, and a protrusion which is inserted into the screw hole when the rear cover enters the opening hole may be formed at both sides of the rear cover.

The left-right stopper and the rubber damper may be manufactured with a material having elasticity.

A stopper recess on which the left-right stopper abuts and slides may be formed at the blade which is inserted into the insertion hole.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
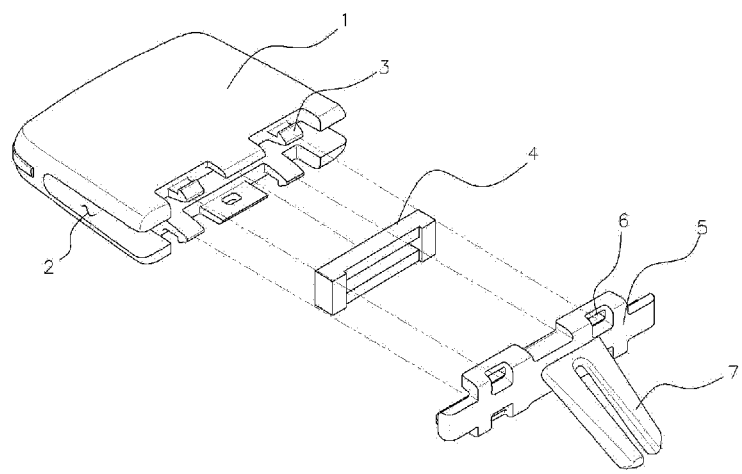
FIG. 1A is an exploded view of a conventional wing knob.
Figure 1B:
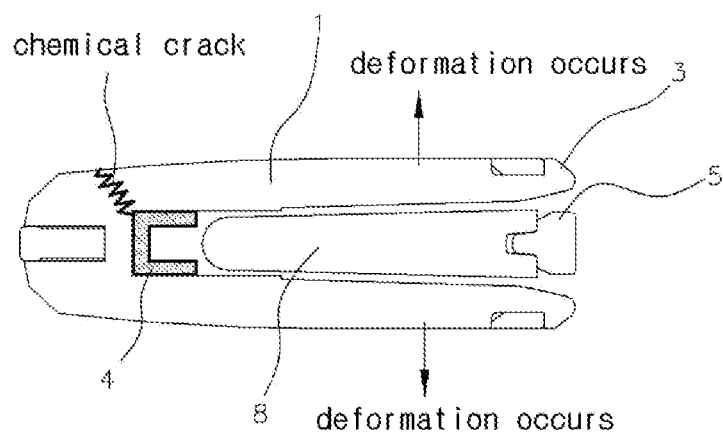
FIG. 1B is a drawing showing a section of the conventional wing knob in a condition where a blade is combined with a conventional wing knob.
Figure 2:
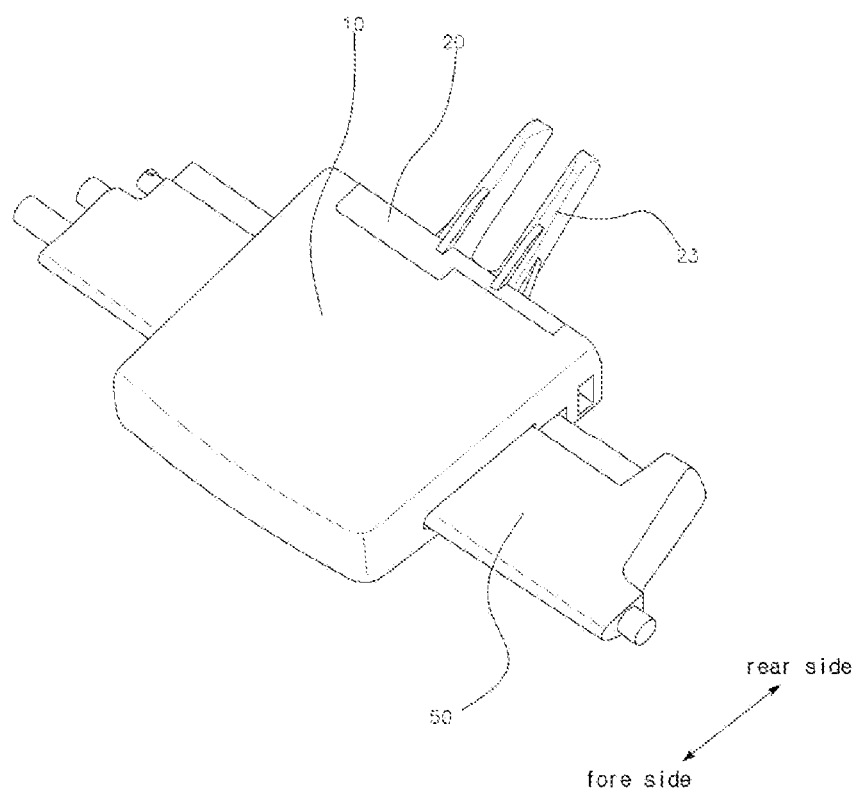
FIG. 2 is a perspective view of an exemplary wing knob according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to a structure of wing knob for an air vent in which an insertion hole is formed, and two latching pins are protruded, and either one among a vertical blade and a horizontal blade arranged in the front side and the rear side is inserted into the insertion hole, and the other one is inserted between the latching pins. Hereinafter various embodiments of the present invention will be described in detail with reference to the drawings.

Referring to drawings, the wing knob according to the present invention is configured by combining a knob body 10 and a rear cover 20, in which when a blade 50 is inserted into an insertion hole of the knob body 10, a rubber damper 40 is placed at front side and a left-right stopper 30 is arranged to be closely pushed at rear side.

That is, the wing knob according to the present invention is assembled in the sequence that, in the condition where the rubber damper 40 is inserted to the front side of the insertion hole 11 of the knob body 10, the blade 50 is inserted into the insertion hole 11 in a lateral direction, and then the rear cover 20 combined with the left-right stopper 30 is mounted on the knob body 10. After assembly is carried out as such, the other one of the vertical blade and the horizontal blade is inserted between latching pins 23 of the rear cover 20.

At the knob body 10 is formed the insertion hole 11 through one side of which either one blade 50 arranged nearer to the inside of the car among the vertical blade and the horizontal blade (arranged perpendicular to each other) penetrates and is inserted, and at the rear side is formed an opening hole 12 through which the rear cover 20 can be inserted.

The rear cover 20 is combined to the knob body 10 in a condition where the left-right stopper 30 is inserted into a mounting section 21 formed to protrude to the front side, and at the rear side is formed the latch pin 23 into which either one blade arranged farther from the inside of the car among the vertical blade and the horizontal blade as described above. The rear cover 20 enters the opening hole 12 to such a degree that the left-right stopper 30 abuts the stopper recess 51 formed at the blade 50 which entered the insertion hole 11.

At both sides of the knob body 10 is formed the screw hole 13 respectively behind the insertion hole 11, and at both sides of the rear cover 20 is formed a protrusion 22 which is inserted into the screw hole 13 when the rear cover 20 enters the opening hole 12.

Furthermore, in the present invention, the insertion hole 11 is formed with a step which minimizes the gap to prevent the clattering while allowing the passage of one side of the blade 50 at which the stopper recess 51 is formed (relatively thin part is formed).

Figure 3:
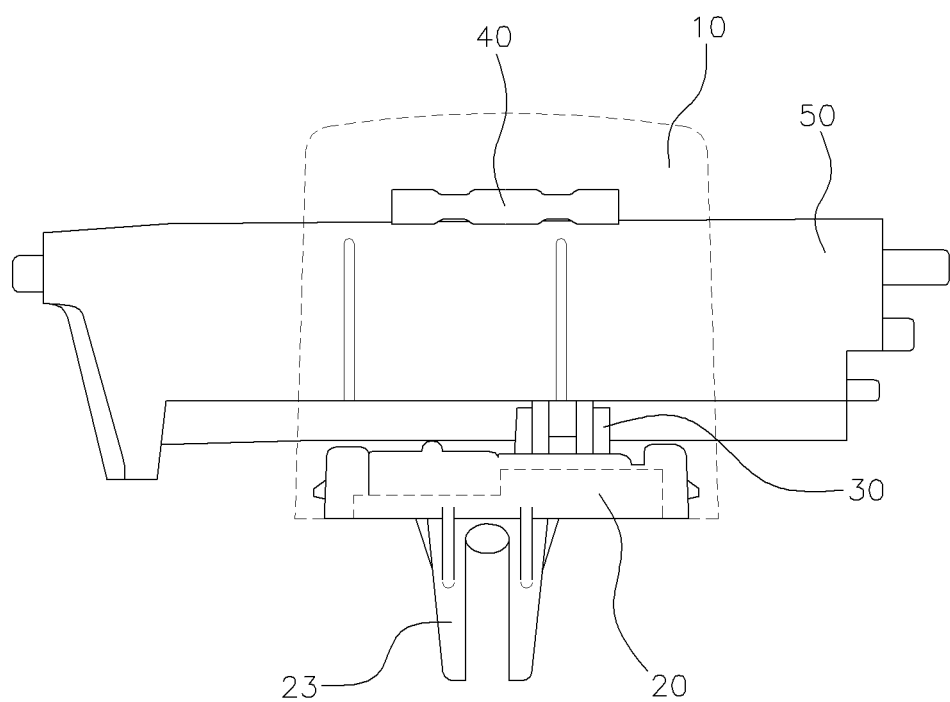
FIG. 3 is an opened-up view of the exemplary wing knob of FIG. 2 to show the interior of the wing knob.
Figure 4:
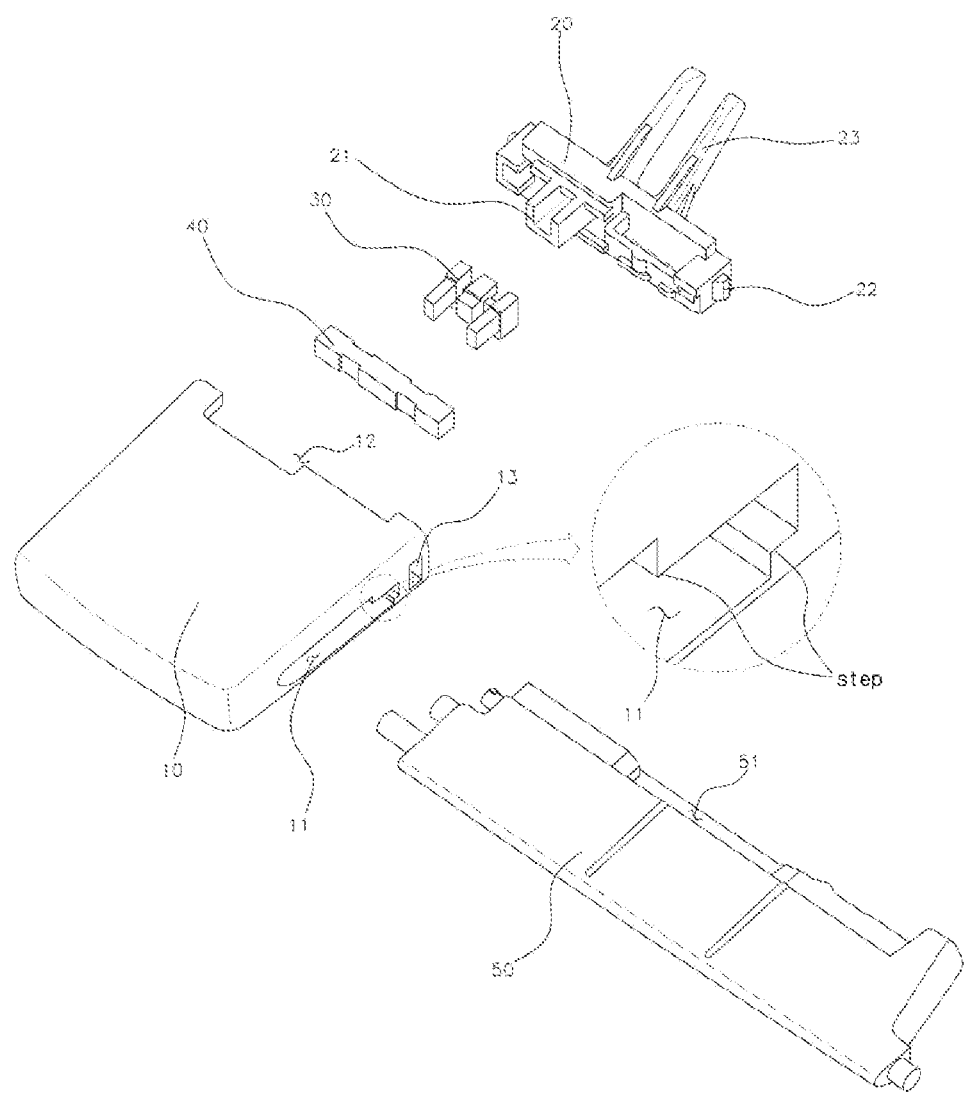
FIG. 4 is an exploded view of the exemplary wing knob of FIG. 2.

Meanwhile, the left-right stopper 30 and the rubber damper 40 are manufactured with a material having elasticity (for example, silicon, and synthetic resin and the like). Therefore, as shown in FIG. 3, in the wing knob of the present invention, since the front side of the blade 50 is supported by the rubber damper 40 and the rear side is supported by the left-right stopper 30 so that an external force is relieved by the elastic force of material, the stress concentration at the combination part of the knob body 10 and the rear cover 20 (part where the protrusion and the screw hole are combined) is removed or sufficiently relieved.

In addition, in the structure of the present invention, since the left-right stopper 30 slides while abutting the stopper recess 51, the excessive sliding which can cause problems at the wing knob can be prevented through the adjustment of the length of the stopper recess 51.

In the wing knob of the present invention having the structure as described above, the insertion hole 11 is formed to have a structure of closed section (only both side surfaces are penetrated unlike the conventional structure in which both side surfaces and the rear side surfaces are all opened) so that post deformation occurring the injection molding of the knob body 10 can be suppressed, and since the front side and the rear side of the blade 50 is closely abutted by the rubber damper 40 and the left-right stopper 30 in the insertion hole 11, the endurance against the damage and the occurrence of crack becomes further strong.

In the present invention having the structure as described above, unlike the conventional structure in which both side surfaces and the rear side surface are all opened, the insertion hole into which the blade is inserted is formed only at both side surfaces (so that the blade can be inserted only in the lateral direction), so that the stress concentration and deformation after injection molding can be suppressed.

In addition, since in the blade of the present invention is formed the stopper recess and the rear cover is mounted while being combined with the left-right stopper, there is the effect that the range of sliding of the knob body can be adjusted (as much as the length of the stopper recess).

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wing knob combined with either one blade among a vertical blade and a horizontal blade for an air vent in which an insertion hole is formed, and two latching pins are protruded, with a front side and a rear side of either one blade among the vertical blade and the horizontal blade at which a stair is formed in a width direction thereof is inserted into the insertion hole, and another among the vertical blade and the horizontal blade is inserted between the two latching pins, the structure comprising:

a knob body at which is formed of the insertion hole closed by steps through one side of which either one blade among the vertical blade and the horizontal blade penetrates and is inserted, wherein at a rear side of the knob body is formed of an opening hole and at both sides of the knob body behind the insertion hole an aperture is formed respectively, wherein the steps are formed at an upper surface and a lower surface inside of the knob body in asymmetric shape with respect to a lateral direction of the knob body and wherein a rear side of the insertion hole formed in the knob body is blocked by a wall and the wall is formed integrally with the steps and extends from one side of the knob body to another side of the knob body in parallel with a longitudinal direction of either one blade among the vertical blade and the horizontal blade to form a closed inner circumference of the insertion hole, wherein a rear cover at a front side of which is combined to a left-right stopper, is formed of the two latching pins at a rear side of the cover, wherein at both sides of the rear cover a protrusion is formed respectively and is inserted into the aperture, and wherein the rear cover is combined with the opening hole so that the left-right stopper is closely pushed to the blade which is inserted into the insertion hole, and wherein a stopper recess which is formed to be depressed downwards from the stair of the blade and on which the left-right stopper abuts and slides is formed at the blade which is inserted into the insertion hole, and adjusts a range of sliding of the left-right stopper;

wherein the steps include a first step connected to a first portion of the wall and a second step connected to a second portion of the wall, and wherein a lower surface of the first step and an upper surface of the second step are in parallel to each other.

2. The wing knob for the air vent of claim 1, wherein a rubber damper is mounted in the insertion hole to be placed at the front side of the blade which is inserted into the insertion hole.

3. The wing knob for the air vent of claim 2, wherein the left-right stopper and the rubber damper are manufactured with a material having elasticity.

* * * * *